United States Patent
Lee et al.

(10) Patent No.: US 8,029,695 B2
(45) Date of Patent: Oct. 4, 2011

(54) POLYMERIZABLE LIQUID CRYSTAL COMPOSITION, HOMEOTROPIC ALIGNMENT LIQUID CRYSTAL FILM MADE FROM THE COMPOSITION AND METHOD FOR PREPARING THE SAME

(75) Inventors: Dae-Hee Lee, Daejeon Metropolitan (KR); Moon-Soo Park, Daejeon Metropolitan (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 12/744,291

(22) PCT Filed: Nov. 21, 2008

(86) PCT No.: PCT/KR2008/006858
§ 371 (c)(1),
(2), (4) Date: May 21, 2010

(87) PCT Pub. No.: WO2009/066947
PCT Pub. Date: May 28, 2009

(65) Prior Publication Data
US 2011/0037026 A1    Feb. 17, 2011

(30) Foreign Application Priority Data

Nov. 23, 2007  (KR) .................. 10-2007-0120051
Mar. 21, 2008  (KR) .................. 10-2008-0026151

(51) Int. Cl.
C09K 19/52   (2006.01)
C09K 19/06   (2006.01)
C09K 19/00   (2006.01)
G02F 1/1333  (2006.01)

(52) U.S. Cl. .................. 252/299.01; 252/299.6; 430/20; 430/631; 428/1.1; 428/1.2; 349/86

(58) Field of Classification Search ............ 252/299.01, 252/299.6; 430/20, 631; 349/86; 428/1.1, 428/1.2
See application file for complete search history.

(56) References Cited

U.S. PATENT DOCUMENTS

| | | | |
|---|---|---|---|
| 6,816,218 B1 | 11/2004 | Coates et al. | |
| 7,410,677 B2 * | 8/2008 | Hirai et al. | ............ 428/1.1 |
| 2005/0224754 A1 | 10/2005 | Hirai et al. | |
| 2006/0040071 A1 | 2/2006 | Oomori et al. | |
| 2006/0127603 A1 | 6/2006 | Kim et al. | |
| 2006/0278851 A1 | 12/2006 | Ito et al. | |
| 2007/0128379 A1 | 6/2007 | Hirai | |
| 2007/0178250 A1 | 8/2007 | Tomioka et al. | |

FOREIGN PATENT DOCUMENTS

EP    1 376 163 A2    1/2004

* cited by examiner

Primary Examiner — Geraldina Visconti
(74) Attorney, Agent, or Firm — McKenna Long & Aldridge LLP

(57) ABSTRACT

The present invention relates to a polymerizable liquid crystal composition that includes a polymerizable reactive homeotropic alignment liquid crystal mixture solution and a primary or secondary amino compound, a homeotropic alignment liquid crystal film using the same, and a method for manufacturing the same. According to the present invention, regardless of the alignment film, a stable homeotropic alignment liquid crystal film may be manufactured.

25 Claims, 5 Drawing Sheets

[Fig. 1]
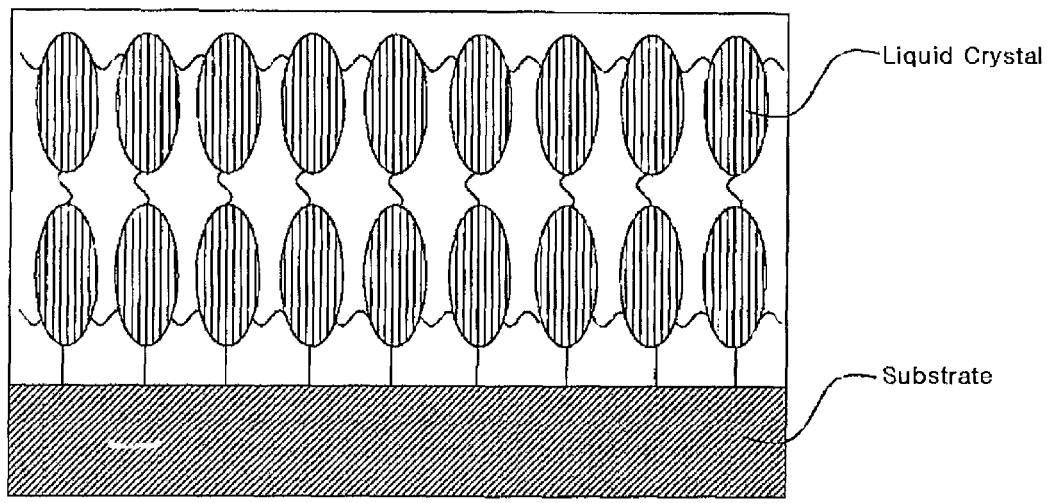
[Fig. 2]
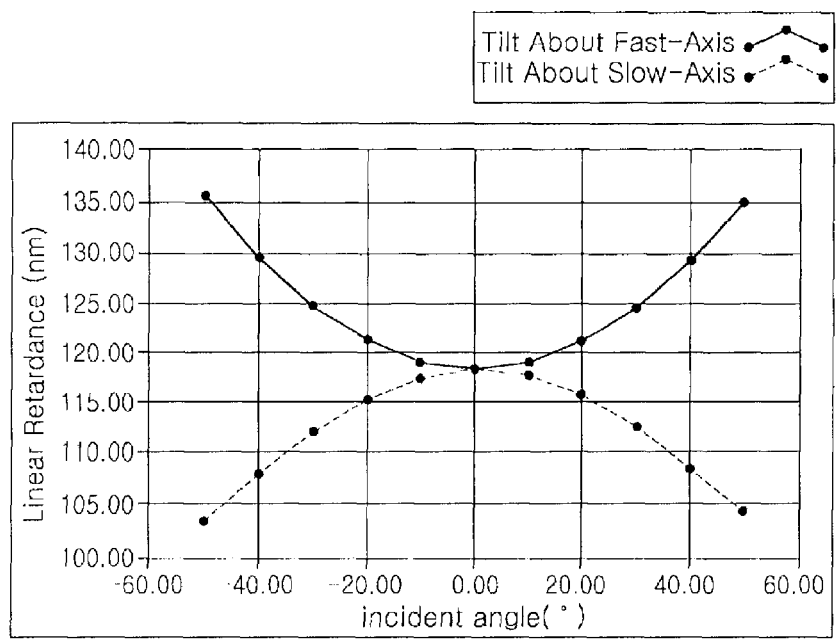

[Fig. 3]
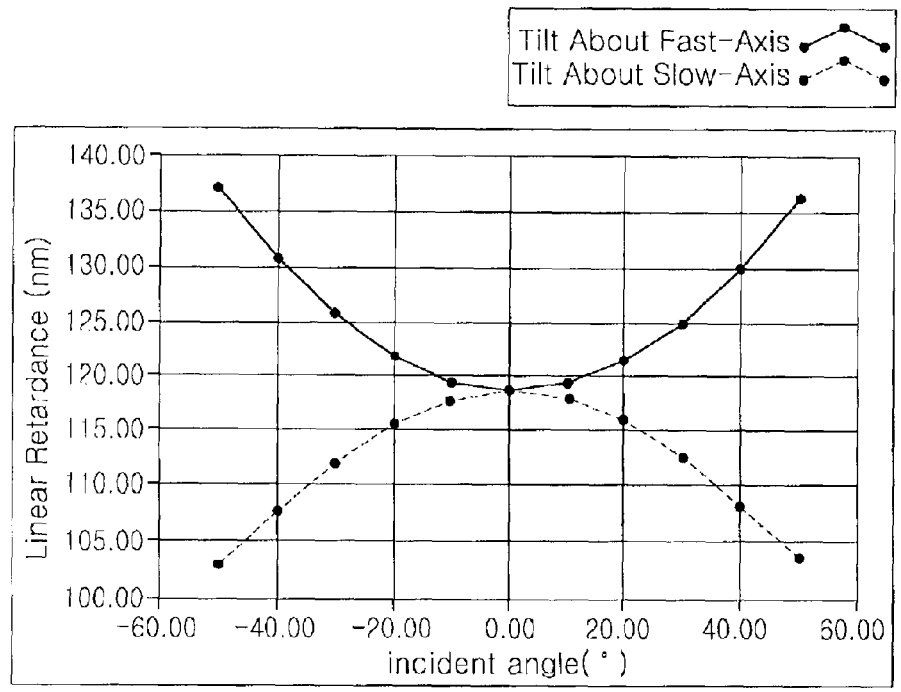
[Fig. 4]
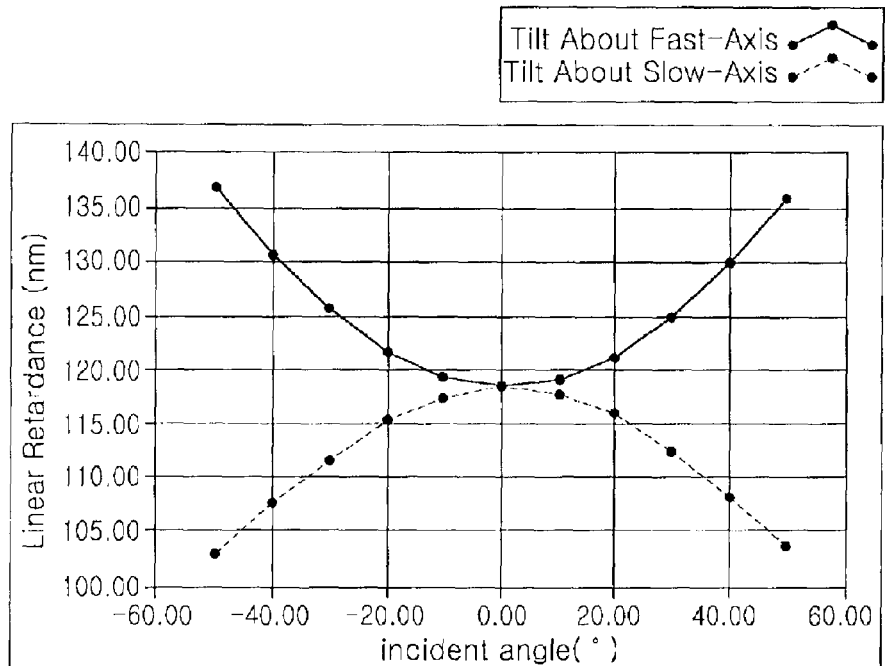

[Fig. 5]
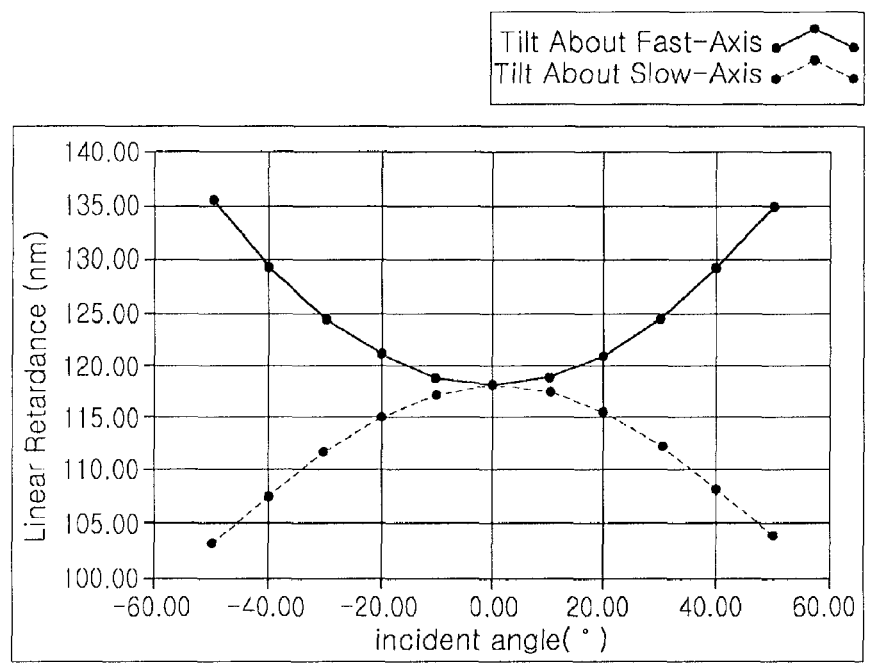
[Fig. 6]
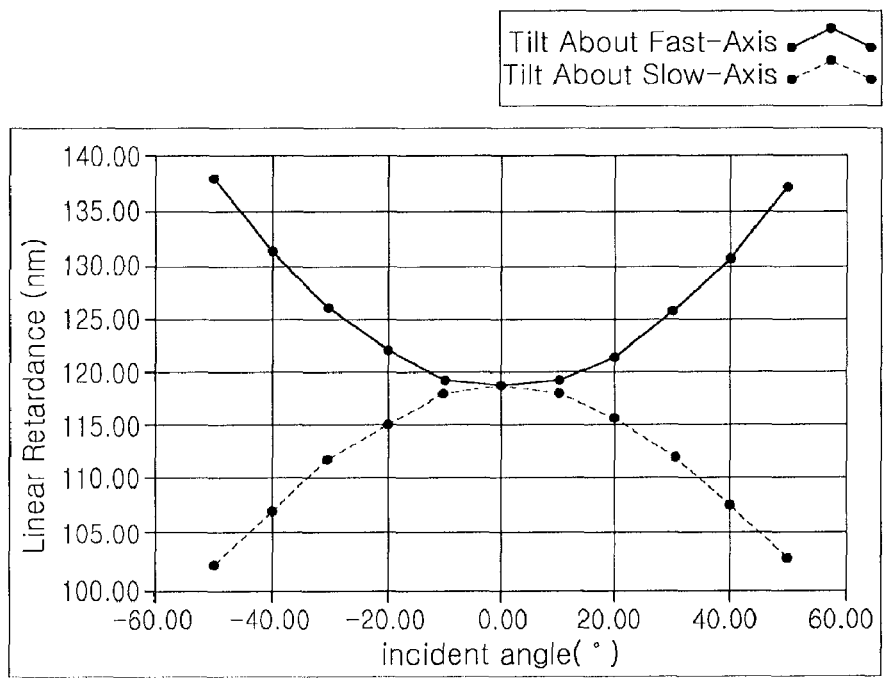

[Fig. 7]
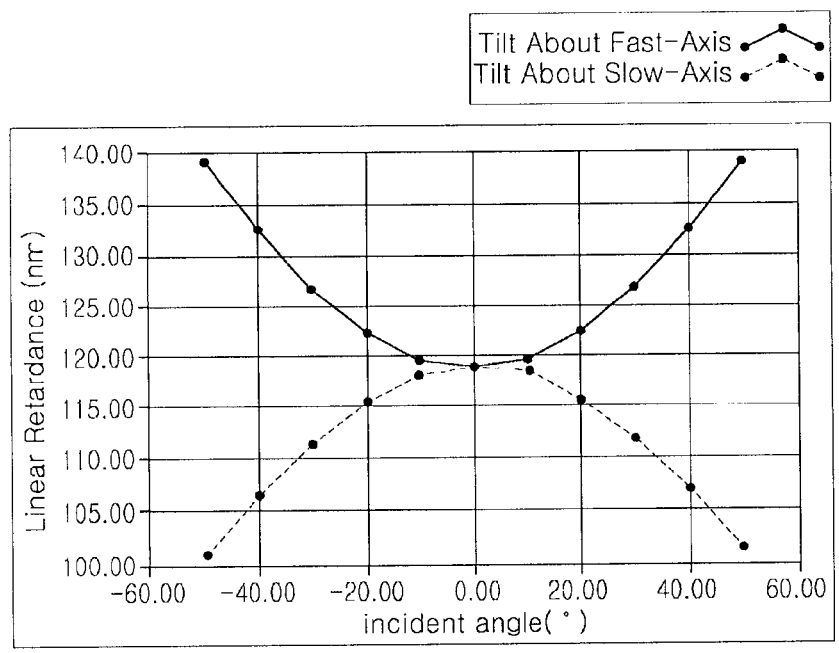
[Fig. 8]
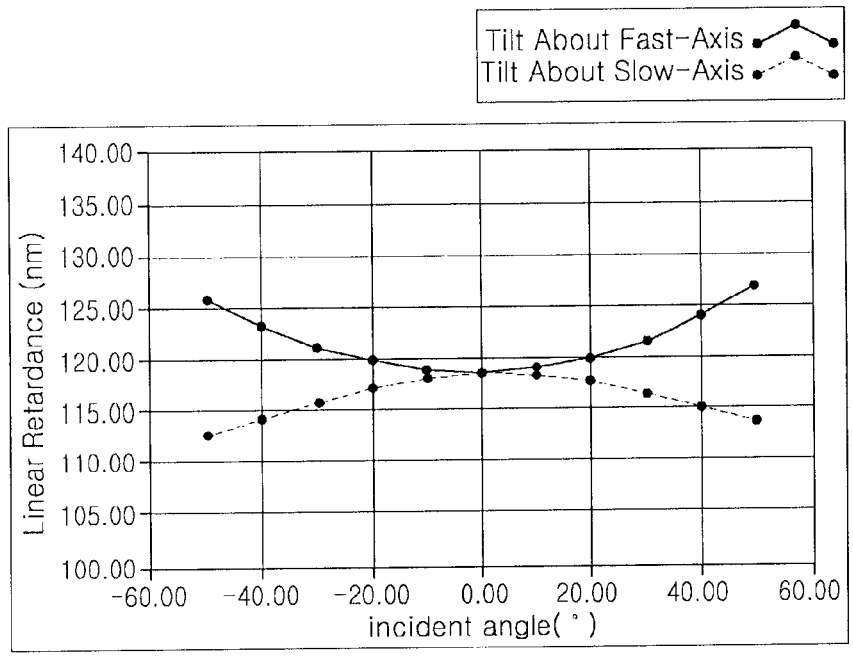

[Fig. 9]
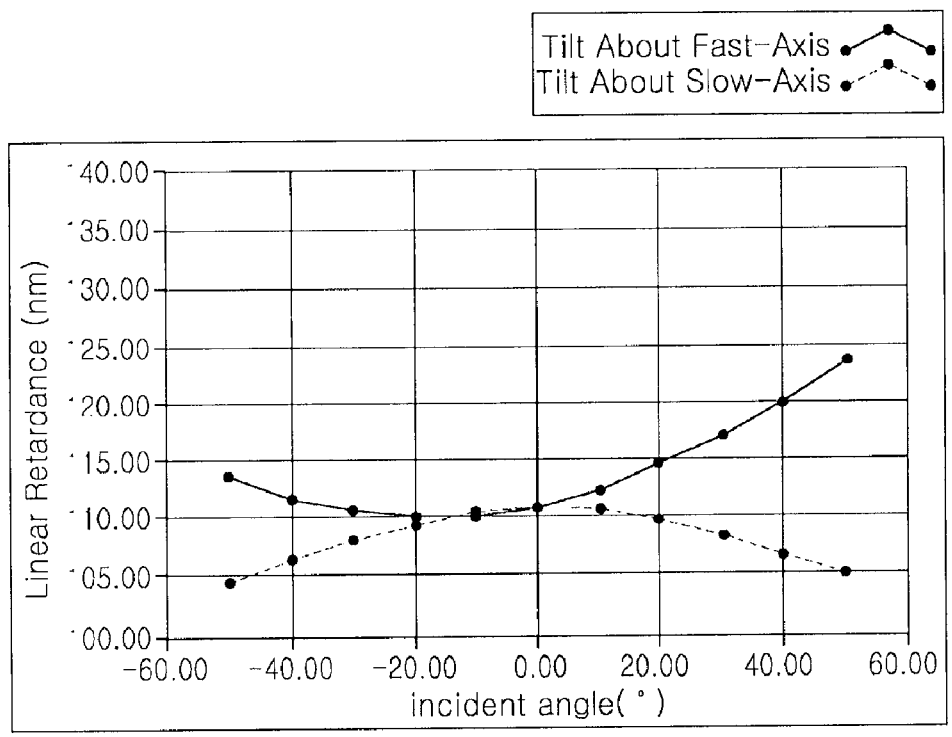

POLYMERIZABLE LIQUID CRYSTAL COMPOSITION, HOMEOTROPIC ALIGNMENT LIQUID CRYSTAL FILM MADE FROM THE COMPOSITION AND METHOD FOR PREPARING THE SAME

This application is a 35 U.S.C. §371 National Stage entry of International Application No. PCT/KR2008/006858, filed on Nov. 21, 2008, and claims priority to Korean Application No. 10-2007-0120051, filed on Nov. 23, 2007 and Korean Application No. 10-2008-0026151, filed on Mar. 21, 2008, which are all hereby incorporated by reference in their entireties.

TECHNICAL FIELD

The present invention relates to a polymerizable liquid crystal composition that includes a polymerizable reactive homeotropic alignment liquid crystal mixture solution and a primary or secondary amino coupling agent, a homeotropic alignment liquid crystal film using the same, and a method for manufacturing the same.

This application claims priority from Korea Patent Application Nos. 10-2007-0120051 and 10-2008-0026151 filed on Nov. 23, 2007, and Mar. 21, 2008 in the KIPO, the disclosure of which is incorporated herein by reference in its entirety.

BACKGROUND ART

In general, liquid crystal may be classified into rod-type liquid crystal and discotic liquid crystal having a coin shape according to the shape. Of three dimensional refractive indexes $n_x$, $n_y$, and $n_z$ of material, the material having at least two different refractive indexes is called a birefringence material, and a direction that is linearly polarized at an incident direction and where no retardation of light occurs is defined by an optic axis. In the rod-type liquid crystal, a long axis direction of a molecule is an optic axis, and in the discotic liquid crystal, a short axid direction of a molecule is an optic axis.

Among them, the alignment state of the rod-type liquid crystal may be largely classified into the following five categories. First, a planar alignment refers to alignment in which an optic axis is parallel in respects to a plane of a film, second, the homeotropic alignment refers to the case of when the optic axis is vertical to a plane of a film, that is, the alignment that is parallel to a normal of a film, and third, a tilted alignment refers to alignment in which an optic axis is tilted at a predetermined angle in the range of 0° to 90° in respects to a plane of a film.

In addition, fourth, a splay alignment refers to alignment in which an optic axis is continuously changed at a tilt angle in the range of 0° to 90°, or a minimum value in the range of 0° to 90°, and fifth, a cholesteric alignment is similar to the planar alignment in that an optic axis is parallel to a plane of a film. The cholesteric alignment refers to alignment in which an optic axis rotates at a predetermined angle clockwise or anticlockwise when it is observed in a direction that is vertical to a plane as it moves in a thickness direction.

Among them, the homeotropic alignment liquid crystal film that belongs to the second alignment state may be used as an optic film such as a retardation film, a viewing angle compensation film and the like in a TN (Twist Nematic) mode, STN (Super Twist Nematic) mode, IPS (In Plane Switching) mode, VA (Vertical Alignment) mode, and OCB (Optically Compensated Birefringence) mode liquid crystal display (LCD) device by using it alone or combining it with another film, and in general, it is manufactured by coating an alignment agent to form a thin alignment film and coating liquid crystal.

In order to attach the homeotropic alignment liquid crystal film to a polarizing plate for brightness improvement or viewing angle compensation, it is required that a roll-to-roll operation in which it is pressed while passing between rollers that are opposite to each other at a predetermined interval like a polarizing plate manufacturing process is performed. In order to perform this, it is preferable that a plastic substrate that is flexible to pressure and a small impact is used.

Some suggestions to form a homeotropic alignment liquid crystal on a plastic film have been given.

U.S. Pat. No. 6,816,218 B1 discloses that an aluminum film that is deposited on a plastic substrate is used as a homeotropic alignment film. In this case, since aluminum is weakly attached to the surface of the plastic substrate, a portion of aluminum is removed when it is stripped, thus it may be a factor of defect.

EP 1376163 A2 discloses that after a liquid crystal solution having horizontal or cholesteric alignment is coated on a plastic substrate, a homeotropic alignment liquid crystal is realized thereon by using it as an alignment film. However, in this case, there is a problem in that according to the degree of curing of the liquid crystal used as the alignment film, the degree of homeotropic alignment of the liquid crystal layer is determined.

US 20060278851 and JP 2006-126757A disclose that a primary amino silane coupling agent is added to a homeotropic alignment liquid crystal solution to form a film having increased attachment strength. However, there is a disadvantage in that this primary amino silane coupling agent makes the alignment of the liquid crystal poor, thus reducing the degree of transparency.

KR 2005-0121835 discloses that an alignment film for deriving a homeotropic alignment of liquid crystal is not separately used but a polymerizable reactive liquid crystal mixture solution including a predetermined surfactant is coated on a plastic substrate, a surface of which is subjected to the hydrophilic treatment to manufacture a homeotropic alignment liquid crystal film. However, there is a big problem in attachment strength between the liquid crystal and the substrate, and since the alignment of the liquid crystal is basically unstable, many defects are formed.

DISCLOSURE

Technical Problem

The present invention has been made to solve the above problems, and it is an object of the present invention to provide a polymerizable liquid crystal composition that has excellent attachment strength regardless of the alignment film and is capable of manufacturing a stable homeotropic alignment liquid crystal film on a substrate, and a method for manufacturing a homeotropic alignment liquid crystal film using the polymerizable liquid crystal composition.

In addition, it is another object of the present invention to provide a homeotropic alignment liquid crystal film that is manufactured by using the above method, and a liquid crystal display device that includes the homeotropic alignment liquid crystal film.

Technical Solution

The present invention provides a polymerizable liquid crystal composition which comprises a polymerizable reactive homeotropic alignment liquid crystal mixture solution; and a primary or secondary amino coupling agent.

In addition, the present invention provides a method for manufacturing a homeotropic alignment liquid crystal film, which comprises the steps of coating a polymerizable liquid crystal composition that includes a polymerizable reactive homeotropic alignment liquid crystal mixture solution, and a primary or secondary amino coupling agent on a plastic substrate, the surface of which is subjected to the hydrophilic treatment.

The primary amino coupling agent may be represented by the following Formula 1:

$$R^1-R^2-NH_2 \qquad \text{[Formula 1]}$$

wherein $R^1$ is an alkyl group having 1 to 20 carbon atoms, and in the alkyl group, —$CH_3$ at an end thereof may be substituted by —$NH_2$, $R^2$ is a single bond, or an alkylene group having 1 to 20 carbon atoms, and in the alkylene group, 1 to 2 —$CH_2$— that are not adjacent to each other may be substituted by —O—, —C(=O)—, —NH—, —CH=CH—, —CONH—, a cyclo alkylene group having 3 to 8 carbon atoms, or an arylene group having 6 to 10 carbon atoms, and any hydrogen of the arylene group may be substituted by an alkyl group having 1 to 4 carbon atoms.

The secondary amino compound may be represented by the following Formula 2 or Formula 3:

$$R^3-R^4-\overset{H}{N}-R^5-R^6 \qquad \text{[Formula 2]}$$

wherein $R^3$ and $R^6$ are each an alkyl group having 1 to 20 carbon atoms, and in the alkyl group, —$CH_3$ at an end thereof may be substituted by —$NH_2$ or —$Si(R')_n(OR'')_{3-n}$, R' and R'' may be the same or different from each other and each are an alkylene group having 1 to 8 carbon atoms, and n is an integer of 0 to 2, $R^4$ and $R^5$ are each a single bond, or an alkylene group having 1 to 20 carbon atoms, and in the alkylene group, 1 to 2 —$CH_2$— that are not adjacent to each other may be substituted by —O—, —C(=O)—, —NH—, —CH=CH—, —CONH—, a cyclo alkylene group having 3 to 8 carbon atoms, or an arylene group having 6 to 10 carbon atoms, and any hydrogen of the arylene group may be substituted by an alkyl group having 1 to 4 carbon atoms,

[Formula 3]

wherein $R^7$, $R^8$ and $R^9$ are each a single bond, or an alkylene group having 1 to 20 carbon atoms, and in the alkylene group, 1 to 2 —$CH_2$— that are not adjacent to each other may be substituted by —O—, —C(=O)—, —NH—, —CH=CH—, —CONH—, a cyclo alkylene group having 3 to 8 carbon atoms, or an arylene group having 6 to 10 carbon atoms, and any hydrogen of the arylene group may be substituted by an alkyl group having 1 to 4 carbon atoms.

Advantageous Effects

According to the present invention, by adding a primary or secondary amino coupling agent to a known polymerizable reactive homeotropic alignment liquid crystal mixture solution, regardless of the alignment film, a stable homeotropic alignment liquid crystal film may be manufactured, thus improving the productivity.

DESCRIPTION OF DRAWINGS

FIG. 1 is a longitudinal sectional view of a homeotropic alignment liquid crystal film that is manufactured on a plastic substrate;

FIG. 2 is a view that illustrates a change curve of a retardation value according to a viewing angle of a homeotropic alignment liquid crystal film that is obtained in Example 1;

FIG. 3 is a view that illustrates a change curve of a retardation value according to a viewing angle of a homeotropic alignment liquid crystal film that is obtained in Example 3;

FIG. 4 is a view that illustrates a change curve of a retardation value according to a viewing angle of a homeotropic alignment liquid crystal film that is obtained in Example 5;

FIG. 5 is a view that illustrates a change curve of a retardation value according to a viewing angle of a homeotropic alignment liquid crystal film that is obtained in Example 7;

FIG. 6 is a view that illustrates a change curve of a retardation value according to a viewing angle of a homeotropic alignment liquid crystal film that is obtained in Comparative Example 1;

FIG. 7 is a view that illustrates a change curve of a retardation value according to a viewing angle of a homeotropic alignment liquid crystal film that is obtained in Comparative Example 2;

FIG. 8 is a view that illustrates a change curve of a retardation value according to a viewing angle of a homeotropic alignment liquid crystal film that is obtained in Comparative Example 3; and FIG. 9 is a view that illustrates a change curve of a retardation value according to a viewing angle of a homeotropic alignment liquid crystal film that is obtained in Comparative Example 4.

BEST MODE

Hereinafter, the present invention will be described in detail below.

In the present invention, a general structure of a primary amino coupling agent that is used while being mixed with a polymerizable reactive homeotropic alignment liquid crystal mixture solution may be represented by Formula 1.

A specific illustrative, but non-limiting example of the preferred primary amino coupling agent include methyl amine, ethyl amine, 1-propyl amine, 2-propyl amine, 1-butyl amine (N-butyl amine), 2-butyl amine, 3-(dimethyl amino) propyl amine and the like.

In the present invention, a general structure of a secondary amino coupling agent that is used while being mixed with a polymerizable reactive homeotropic alignment liquid crystal mixture solution may be represented by Formula 2 or Formula 3.

In addition, the secondary amino coupling agent may be represented by any one of the following Formula 4 or Formula 6.

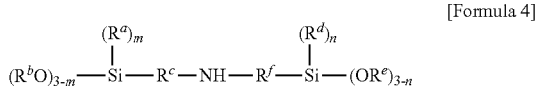
[Formula 4]

wherein $R^a$, $R^b$, $R^d$ and $R^e$ may be the same or different from each other and each are a hydrocarbon group having 1 to 8 carbon atoms, $R^c$ and $R^f$ may be the same or different from each other and each are an alkylene group having 1 to 20 carbon atoms, in the alkylene group, 1 to 2 —CH$_2$— that are not adjacent to each other may be substituted by —O—, —NH—, —CH═CH—, —CONH—, a cyclo alkylene group having 3 to 8 carbon atoms, or an arylene group having 6 to 10 carbon atoms, and any hydrogen of the arylene group may be substituted by an alkyl group having 1 to 4 carbon atoms, and n and m are each an integer of 0 to 2.

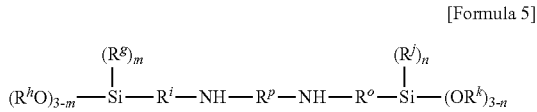
[Formula 5]

wherein $R^g$, $R^h$, $R^j$ and $R^k$ may be the same or different from each other and each are a hydrocarbon group having 1 to 8 carbon atoms, $R^i$, $R^o$ and $R^p$ may be the same or different from each other and each are an alkylene group having 1 to 20 carbon atoms, in the alkylene group, 1 to 2 —CH$_2$— that are not adjacent to each other may be substituted by —O—, —NH—, —CH═CH—, —CONH—, a cyclo alkylene group having 3 to 8 carbon atoms, or an arylene group having 6 to 10 carbon atoms, and any hydrogen of the arylene group may be substituted by an alkyl group having 1 to 4 carbon atoms, and n and m are each an integer of 0 to 2.

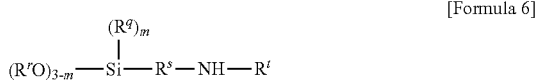
[Formula 6]

wherein $R^q$, $R^r$ and $R^t$ may be the same or different from each other and each are a hydrocarbon group having 1 to 8 carbon atoms, $R^s$ may be an alkylene group having 1 to 20 carbon atoms, in the alkylene group, 1 to 2 —CH$_2$— that are not adjacent to each other may be substituted by —O—, —NH—, —CH═CH—, —CONH—, a cyclo alkylene group having 3 to 8 carbon atoms, or an arylene group having 6 to 10 carbon atoms, and any hydrogen of the arylene group may be substituted by an alkyl group having 1 to 4 carbon atoms, and m is each an integer of 0 to 2.

Specific illustrative, but non-limiting examples of the preferred primary or secondary amino coupling agent include dimethyl amine, diethyl amine, dipropyl amine, dibutyl amine, azetidine, pyrrolidine, piperidine, cyclo propyl amine, cyclo butyl amine, cyclo propyl amine, cyclo hexyl amine, 2-azetidinone, 2-pyrrolidinone, and 2-piperidinone.

Additional illustrative, but non-limiting examples of the secondary amino coupling agent include bis(3-trimethoxy silylpropyl) amine, bis(3-triethoxy silylpropyl) amine, bis(3-trimethoxy silylpropyl)ethylene diamine, bis(3-triethoxy silylpropyl)ethylene diamine, N-(n-butyl)-3-amino propyl trimethoxy silane, N-(n-butyl)-3-amino propyl triethoxy silane, N-methyl amino propyl trimethoxy silane, and N-methyl amino propyl triethoxy silane.

The most preferable primary, or secondary amino coupling agent may be represented by the following Formula 7-1 to Formula 7-4.

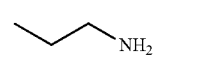
[Formula 7-1]

[Formula 7-2]

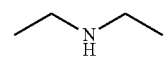
[Formula 7-3]

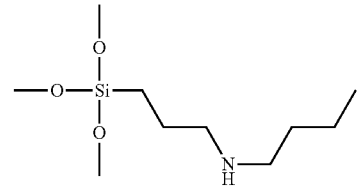
[Formula 7-4]

It is preferable that the primary, or secondary amino coupling agent that is mixed with the polymerizable reactive homeotropic alignment liquid crystal mixture solution is included in an amount of 0.01 to 10 parts by weight on the basis of the reactive homeotropic alignment liquid crystal mixture solution. In the case of when the content of the amino coupling agent is less than 0.01 parts by weight, an adhesion strength is poor, and in the case of when the content is more than 10 parts by weight, the alignment state of the liquid crystal becomes poor.

The polymerizable reactive homeotropic alignment liquid crystal mixture solution that is used in the present invention may further include a surfactant, a photoinitiator, a reactive liquid crystal monomer and a solvent.

Examples of the usable surfactant include fluorocarbons and silicons. Examples of the fluorocarbon surfactant include Fluorad (trademark) FC4430 manufactured by 3M, Co., Ltd. in the USA, Fluorad FC4432, Fluorad FC4434, and Zonyl manufactured by Dupont, Co., Ltd. in the USA, and examples of the silicon surfactant may include BYK (trademark) manufactured by BYK-Chemie, Co., Ltd.

At this time, it is preferable that the content of the surfactant is in the range of 0.05 to 1 parts by weight on the basis of the polymerizable, reactive homeotropic alignment liquid crystal mixture solution. In the case of when the content of the surfactant is less than 0.05 parts by weight, the surface state of the liquid crystal is bad. In the case of when the content is more than 1 parts by weight, since it is added in an excessive amount, micelles of the surfactant are generated to form stains.

In addition, the photoinitiator may be classified into a free radical photoinitiator and a photoinitiator for generating ions according to the kind of material for initiating the polymerization reaction, examples of the free radical photoinitiator include Irgacure (trademark) 907, Irgacure 651, and Irgacure 184 manufactured by Ciba-Geigy, Co., Ltd. in Switzerland, and examples of the cationic photopolymerization initiator include UVI (trademark) 6974 manufactured by Union Carbide, Co., Ltd.

It is preferable that the content of the photoinitiator is in the range of 1 to 10 parts by weight on the basis of the polymerizable reactive homeotropic alignment liquid crystal mixture solution. In the case of when the content of the photoinitiator is less than 1 part by weight, the uncuring of the liquid crystal occurs. In the case of when the content is more than 10 parts by weight, the alignment of the liquid crystal is poor.

If the reactive liquid crystal monomer is polymerized with the liquid crystal monomer that is adjacent to the reactive liquid crystal monomer by light or heat to form a polymer, the kind of the monomer is not limited. Examples of the reaction group that causes the polymerization reaction of the reactive liquid crystal monomer may include a group to which acrylate is attached. Specific examples of the reactive liquid crystal monomer may include reactive liquid crystal monomers represented by the following Formula 8 to Formula 12, and one or more selected from the group consisting of the following Formula 8 to Formula 12 may be used.

form, dichloromethane, tetrachloroethane, trichloroethylene, tetrachloroethylene, and chlorobenzene; aromatic hydrocarbons such as benzene, toluene, xylene, methoxy benzene, and 1,2-dimethoxybenzene; alcohols such as acetone, methyl ethyl ketone, cyclohexanone, and cyclopentanone; cellosolves such as methyl cellosolve, ethyl cellosolve, and butyl cellosolve; and ethers such as diethylene glycol dimethyl ether (DEGDME), and dipropylene glycol dimethyl ether (DPGDME). In addition, the solvent may be used alone or as a mixture thereof.

Next, a plastic substrate that is suitable to be used in the present invention will be described. Examples of the plastic substrate, to which the polymerizable liquid crystal composition is easily attached and which has good alignment property, include cyclo olefin polymers such as polyethylene terephthalate, polycarbonate, polyethylene, and a norbornene

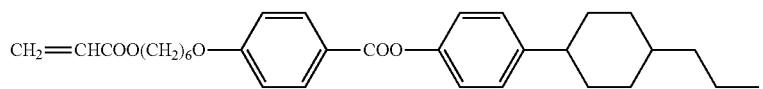

[Formula 8]

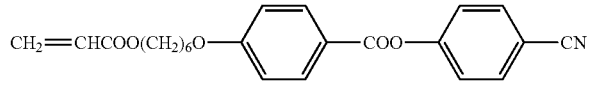

[Formula 9]

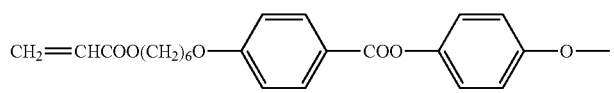

[Formula 10]

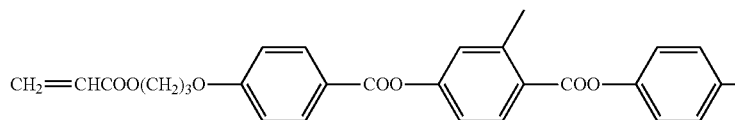

[Formula 11]

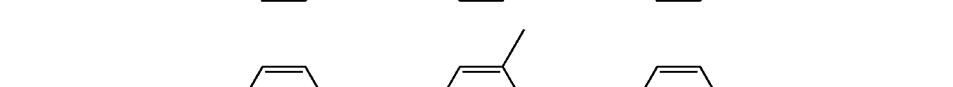

[Formula 12]

When the reactive liquid crystal monomer is dissolved in the solvent, the concentration of solids varies according to a thickness and a coating process of the required liquid crystal layer, but is not particularly limited. The concentration is in the range of preferably 5 to 70% by weight, and more preferably 10 to 50% by weight.

For reference, when the concentration of the solids is less than 5% by weight, since the amount of solvent is large, the drying time is long or fluidization of the surface becomes significant after the coating. Thus, stains may be increased. When the concentration is 70% by weight or more, the amount of solvent is small as compared to the solids, since the liquid crystal is precipitated during the storage or the viscosity is very high, wettability may be reduced during the application.

If the solvent that is included in the reactive homeotropic alignment liquid crystal mixture solution that is capable of being polymerized in conjunction with the above surfactant, the photoinitiator and the reactive liquid crystal monomer has the excellent solubility and coating property to the corresponding liquid crystal mixture and does not corrode the substrate during the application, the kind of the solvent is not particularly limited.

Specific illustrative, but non-limiting examples of the solvent may include halogenated hydrocarbons such as chloroderivative, and since these plastic substrates are frequently used in the industry, they may be easily obtained from various companies.

In addition, in the case of the plastic substrate that is capable of being applied to a roll-to-roll process, a corona discharge treatment or a plasma treatment may be carried out so that the surface thereof has the hydrophilicity.

In the case of the plastic substrate, since many products have excellent flexibility and durability, it is very competitive in terms of the roll-to-roll manufacturing and high-speed manufacturing.

Hereinafter, by coating the polymerizable liquid crystal composition including the primary, or secondary amino coupling agent according to the present invention on the plastic substrate having the rough surface that is subjected to the hydrophilic treatment such as the corona discharge treatment or the plasma treatment, a detailed manufacturing process for obtaining the homeotropic alignment liquid crystal layer having the excellent alignment strength and attachment strength will be described below.

First, illustrative, but non-limiting examples of the method for coating the polymerizable liquid crystal composition including the primary, or secondary amino coupling agent on the plastic substrate preferably include a method for performing a uniform thickness coating. Examples of the coating method include a spin coating method, a micro gravure coating method, a gravure coating method, a dip coating method, and a spray coating method.

The thickness of the homeotropic alignment liquid crystal film layer varies according to the required retardation, that is, $\Delta n$ (birefringence)$\times$d (thickness of the liquid crystal layer), but in general, it is preferable that it is in the range of 0.1 μm to 10 μm.

A method for removing the solvent in the polymerizable liquid crystal composition solution that is coated on the substrate in a predetermined concentration as the coating method is not particularly limited as long as the solvent is mostly removed by using the method and the coated liquid crystal layer does not flow down or is significantly fluidized. In general, methods such as drying at room temperature, drying in a dry oven, drying on a heating plate by heat, and drying using infrared rays may be used.

After the solvent is vaporized, a process for curing the homeotropically aligned liquid crystal layer by using polymerization is required. A method for curing the liquid crystal may be classified into curing by using light and curing by using heat. The liquid crystal mixture that is used in the present invention is a photoreactive liquid crystal mixture and a material that is fixed by irradiation of ultraviolet rays.

At this time, the polymerization process is carried out under the presence of the photoinitiator for absorbing the wavelength at the ultraviolet ray region, and the irradiation of ultraviolet rays may be carried out under the atmosphere or under the nitrogen atmosphere in order to increase the reaction efficiency by blocking oxygen.

As an irradiation device for ultraviolet rays, in general, a middle pressure or high pressure mercury UV lamp or a metallic halide lamp having the intensity of illumination of about 100 mW/cm$^2$ or more is used.

In addition, during the irradiation of ultraviolet rays, a cold mirror or a cooling device may be provided between the substrate and the UV lap so that the surface temperature of the liquid crystal layer is in the range of the liquid crystal temperature.

There are many methods for measuring the presence of the homeotropic alignment of the liquid crystal film that is obtained by using the above method and quantitative retardation thereof. The presence of the homeotropic alignment of the liquid crystal film may be confirmed between orthogonal polarizing plates by the naked eye or by using a polarized microscope.

That is, since the liquid crystal film is provided between the orthogonal polarizing plates and the homeotropically aligned liquid crystal layer does not cause the retardation when watching is performed in an incident direction that is vertical to the film surface, permeation of light does not occur, thus a black color is obtained. If the watching is performed while the incident angle varies, since the retardation occurs, the permeation of light occurs. Thus, it gets bright.

At this time, the quantitative retardation in a direction that is inclined at a predetermined angle in respects to the vertical incident angle may be measured by using KOBRA-21ADH (Oji Scientific Instrument, Co., Ltd. in Japan) or AxoScan (Axometrics, Co., Ltd.) that is an automatic birefringence measuring device.

The homeotropic alignment liquid crystal film that is coated on the plastic substrate according to the present invention is not stripped and applied to the polarized plate as it is, and may be very useful as a retardation film or a viewing angle compensation film in various types of LCD modes such as an IPS mode.

MODE FOR INVENTION

A better understanding of the present invention may be obtained in light of the following Examples which are set forth to illustrate, but are not to be construed to limit the present invention.

EXAMPLE 1

The liquid crystal monomer that was included in the polymerizable reactive homeotropic alignment liquid crystal mixture solution used in Examples of the present invention was represented by Formula 8 to Formula 12.

The compound of Formula 8 was manufactured according to the method disclosed in GB 2,280,445, the compounds of Formulas 9, 10, and 12 were manufactured according to the method disclosed in documents by D. J. Broer et al. [Makromol. Chem. 190, 3201-3215 (1989)], and the compound of Formula 11 was manufactured according to the method disclosed in WO93/22397. The polymerizable reactive homeotropic alignment liquid crystal mixture (LC1) was manufactured by using the following procedure.

| liquid crystal monomer | Formula 8 | 30.8 wt % |
|---|---|---|
|  | Formula 9 | 21.8 wt % |
|  | Formula 10 | 21.8 wt % |
|  | Formula 11 | 20.1 wt % |
| photoinitiator | Irgacure 907 | 5.5 wt % |

The polymerizable reactive homeotropic alignment liquid crystal mixture (LC1) was put into toluene so that the concentration of solids was 25% by weight, and heated at 50° C. for 1 hour to manufacture the polymerizable reactive homeotropic alignment liquid crystal mixture solution.

To the polymerizable reactive homeotropic alignment liquid crystal mixture solution, Fluorad (trademark, manufactured by 3M, Co., Ltd. in the USA) FC4430 that was the fluorocarbon surfactant was added in an amount of 0.3 parts by weight on the basis of the liquid crystal mixture solution.

Finally, the amino coupling agent (3-propylamine) that was represented by Formula 7-1 was added in an amount of 1 parts by weight on the basis of the reactive homeotropic alignment liquid crystal mixture solution.

As a substrate for polymerizable liquid crystal composition coating, Zeonor (trademark, manufactured by Zeon, Co., Ltd. in Japan) that was the norbornene derivative film was used while being subjected to the corona discharge treatment.

The polymerizable reactive homeotropic alignment liquid crystal mixture solution that included the amino coupling agent represented by Formula 7-1 was coated by using the wire bar coater, left at 50° C. in a dry oven for 2 min, and cured once at a rate of 3 m/min by using the high pressure mercury lamp of 80 W/cm$^2$. The manufactured liquid crystal film was very transparent and the thickness of the film was 1 μm.

The manufactured liquid crystal film had the same structure as FIG. 1 and the very excellent bonding strength, and was not stripped from the substrate at all. In addition, in order to examine the optical property of the liquid crystal film, the retardation of the liquid crystal film bonded to the substrate was measured by using AxoScan (Axometrics, Co., Ltd.), and the results were shown in FIG. 2.

According to FIG. 2, since the retardation by the liquid crystal did not occur in a direction that was vertical to the film and the retardation was increased as the viewing angle was increased, the − direction and the + direction of the viewing angle were opposite to each other. Thus, it can be seen that there is the liquid crystal film in which the liquid crystal molecules of the liquid crystal film are aligned in a direction that is vertical to the film surface.

EXAMPLE 2

The polymerizable reactive homeotropic alignment liquid crystal mixture (LC2) was manufactured by using the following procedure.

| liquid crystal monomer | Formula 8 | 32.7 wt % |
|---|---|---|
| | Formula 9 | 18.7 wt % |
| | Formula 11 | 21.5 wt % |
| | Formula 12 | 20.5 wt % |
| photoinitiator | Irgacure 907 | 5.6 wt % |

The liquid crystal film was obtained by using the same method as Example 1, except that the polymerizable reactive homeotropic alignment liquid crystal mixture (LC2) was used, and the manufactured liquid crystal film was very transparent and the thickness of the film was 1 μm.

The liquid crystal film thusly manufactured was the structure shown in FIG. 1, and because of its very excellent bonding strength, it is not stripped from the substrate.

In addition, in order to examine the optical property of the liquid crystal film, the retardation of the liquid crystal film bonded to the substrate was measured by using AxoScan (Axometrics, Co., Ltd.), and it can be seen that the liquid crystal film that is aligned in a vertical direction is obtained.

EXAMPLE 3

The liquid crystal film was obtained by using the same method as Example 1, except that the amino coupling agent represented by Formula 7-2 was used, and the manufactured liquid crystal film was very transparent and the thickness of the film was 1 μm.

The liquid crystal film thusly manufactured was the structure shown in FIG. 1, and because of its very excellent bonding strength, it was not stripped from the substrate.

In addition, in order to examine the optical property of the liquid crystal film, the retardation of the liquid crystal film bonded to the substrate was measured by using AxoScan (Axometrics, Co., Ltd.), and the results are shown in FIG. 3.

By FIG. 3, it can be seen that the liquid crystal film is a liquid crystal film that is aligned in a vertical direction.

EXAMPLE 4

The liquid crystal film was obtained by using the same method as Example 2, except that the amino coupling agent represented by Formula 7-2 was used, and the manufactured liquid crystal film was very transparent and the thickness of the film was 1 μl.

The liquid crystal film thusly manufactured was the structure shown in FIG. 1, and because of its very excellent bonding strength, it was not stripped from the substrate.

In addition, in order to examine the optical property of the liquid crystal film, the retardation of the liquid crystal film bonded to the substrate was measured by using AxoScan (Axometrics, Co., Ltd.), and it can be seen that the liquid crystal film that is aligned in a vertical direction is obtained.

EXAMPLE 5

The liquid crystal film was obtained by using the same method as Example 1, except that the amino coupling agent represented by Formula 7-3 was used, and the manufactured liquid crystal film was very transparent and the thickness of the film was 1 μm.

The liquid crystal film thusly manufactured was the structure shown in FIG. 1, and because of its very excellent bonding strength, it was not stripped from the substrate.

In addition, in order to examine the optical property of the liquid crystal film, the retardation of the liquid crystal film bonded to the substrate was measured by using AxoScan (Axometrics, Co., Ltd.), and the results are shown in FIG. 4.

By FIG. 4, it can be seen that the liquid crystal film is a liquid crystal film that is aligned in a vertical direction.

EXAMPLE 6

The liquid crystal film was obtained by using the same method as Example 2, except that the amino coupling agent represented by Formula 7-3 was used, and the manufactured liquid crystal film was very transparent and the thickness of the film was 1 μm.

The liquid crystal film thusly manufactured was the structure shown in FIG. 1, and because of its very excellent bonding strength, it was not stripped from the substrate.

In addition, in order to examine the optical property of the liquid crystal film, the retardation of the liquid crystal film bonded to the substrate was measured by using AxoScan (Axometrics, Co., Ltd.), and it can be seen that the liquid crystal film that is aligned in a vertical direction is obtained.

EXAMPLE 7

The liquid crystal film was obtained by using the same method as Example 1, except that the amino coupling agent represented by Formula 7-4 was used, and the manufactured liquid crystal film was very transparent and the thickness of the film was 1 μm.

The liquid crystal film thusly manufactured was the structure shown in FIG. 1, and because of its very excellent bonding strength, it was not stripped from the substrate.

In addition, in order to examine the optical property of the liquid crystal film, the retardation of the liquid crystal film bonded to the substrate was measured by using AxoScan (Axometrics, Co., Ltd.), and the results are shown in FIG. 5.

By FIG. 5, it can be seen that the liquid crystal film is a liquid crystal film that is aligned in a vertical direction.

EXAMPLE 8

The liquid crystal film was obtained by using the same method as Example 2, except that the amino coupling agent represented by Formula 7-4 was used, and the manufactured liquid crystal film was very transparent and the thickness of the film was 1 μm.

The liquid crystal film thusly manufactured was the structure shown in FIG. 1, and because of its very excellent bonding strength, it was not stripped from the substrate.

In addition, in order to examine the optical property of the liquid crystal film, the retardation of the liquid crystal film bonded to the substrate was measured by using AxoScan (Axometrics, Co., Ltd.), and it can be seen that the liquid crystal film that is aligned in a vertical direction is obtained.

COMPARATIVE EXAMPLE 1

The liquid crystal film was obtained by using the same method as Example 1, except that the amino coupling agent was not used in the liquid crystal, and the manufactured liquid crystal film was transparent and the thickness of the film was 1 μm.

However, it was observed that the liquid crystal film thusly manufactured had a plurality of craters (diameter about 100 μm), and since the bonding strength was very poor, it was completely stripped from the substrate.

In addition, in order to examine the optical property of the liquid crystal film, the retardation of the liquid crystal film bonded to the substrate was measured by using AxoScan (Axometrics, Co., Ltd.), and the results are shown in FIG. 6.

By FIG. 5, it can be seen that the liquid crystal film is a liquid crystal film that is aligned in a vertical direction.

COMPARATIVE EXAMPLE 2

The liquid crystal film was obtained by using the same method as Example 2, except that the amino coupling agent was not used in the liquid crystal, and the manufactured liquid crystal film was transparent and the thickness of the film was 1 μm.

However, it was observed that the liquid crystal film thusly manufactured had a plurality of craters (diameter about 100 μm), and since the bonding strength was very poor, it was completely stripped from the substrate.

In addition, in order to examine the optical property of the liquid crystal film, the retardation of the liquid crystal film bonded to the substrate was measured by using AxoScan (Axometrics, Co., Ltd.), and the results are shown in FIG. 7.

By FIG. 7, it can be seen that the liquid crystal film is a liquid crystal film that is aligned in a vertical direction.

COMPARATIVE EXAMPLE 3

The liquid crystal film was obtained by using the same method as Example 1, except that 3-Amino propyl trimethoxy silane that was the primary amino silane coupling agent was used in the liquid crystal, and the manufactured liquid crystal film was opaque and the thickness of the film was 1 μm.

In addition, in order to examine the optical property of the liquid crystal film, the retardation of the liquid crystal film bonded to the substrate was measured by using AxoScan (Axometrics, Co., Ltd.), and the results are shown in FIG. 8.

In the liquid crystal film thusly manufactured, the bonding strength was excellent, but there was a problem in homeotropic alignment, thus the birefringence (Δ n) was reduced.

COMPARATIVE EXAMPLE 4

The liquid crystal film was obtained by using the same method as Example 2, except that 3-Amino propyl trimethoxy silane that was the primary amino silane coupling agent was used in the liquid crystal, and the manufactured liquid crystal film was opaque and the thickness of the film was 1 μm.

In addition, in order to examine the optical property of the liquid crystal film, the retardation of the liquid crystal film bonded to the substrate was measured by using AxoScan (Axometrics, Co., Ltd.), and the results are shown in FIG. 9.

In the liquid crystal film thusly manufactured, the bonding strength was excellent, but there was a problem in homeotropic alignment, thus the birefringence (Δ n) was reduced.

The following Table 1 compares the alignments and the attachment strengths of the samples to each other.

TABLE 1

| sample | homeotropic alignment | birefringence (Δn) | attachment | Crater |
|---|---|---|---|---|
| Example 1 | good | 0.12 | unstripped | none |
| Example 2 | good | 0.12 | unstripped | none |
| Example 3 | good | 0.12 | unstripped | none |
| Example 4 | good | 0.12 | unstripped | none |
| Example 5 | good | 0.12 | unstripped | none |
| Example 6 | good | 0.12 | unstripped | none |
| Example 7 | good | 0.12 | unstripped | none |
| Example 8 | good | 0.12 | unstripped | none |
| Comparative Example 1 | good | 0.12 | stripped | crater |
| Comparative Example 2 | good | 0.12 | stripped | crater |
| Comparative Example 3 | bad | 0.09 | unstripped | none |
| Comparative Example 4 | bad | 0.08 | unstripped | none |

Δn (birefringence) = $R_{th}$ (thickness retardation)/d (thickness of liquid crystal layer)

INDUSTRIAL APPLICABILITY

If a polymerizable liquid crystal composition according to the present invention is used, by adding a primary or secondary amino coupling agent to a known polymerizable reactive homeotropic alignment liquid crystal mixture solution, regardless of the alignment film, a stable homeotropic alignment liquid crystal film may be manufactured, thus improving the productivity.

The invention claimed is:

1. A polymerizable liquid crystal composition comprising:
a polymerizable reactive homeotropic alignment liquid crystal mixture; and
a primary or secondary amino coupling agent,
wherein the primary amino coupling agent is represented by the following Formula 1:

$$R^1—R^2—NH_2 \quad \text{[Formula 1]}$$

wherein $R^1$ is an alkyl group having 1 to 20 carbon atoms, and in the alkyl group, —$CH_3$ at an end thereof may be substituted by —NH2,
$R^2$ is a single bond, or an alkylene group having 1 to 20 carbon atoms, and in the alkylene group, 1 to 2 —$CH_2$- that are not adjacent to each other may be substituted by —O—, —(O)—, —NH—, —CH=CH—, —CONH—, a cyclo alkylene group having 3 to 8 carbon atoms, or an arylene group having 6 to 10 carbon atoms, and any hydrogen of the arylene group may be substituted by an alkyl group having 1 to 4 carbon atoms; and
wherein the secondary amino coupling agent is represented by the following Formula 2 or Formula 3:

[Formula 2]

$$R^3—R^4—\overset{H}{N}—R^5—R^6$$

wherein $R^3$ and $R^6$ are each an alkyl group having 1 to 20 carbon atoms, and in the alkyl group, —CH3 at an end thereof may be substituted by —$NH_2$ or —$Si(R')_n(OR'')_{3-n}$, R' and R'' may be the same or different from each other and each are an alkylene group having 1 to 8 carbon atoms, and n is an integer of 0 to 2, R⁴ and R⁵ are each a single bond, or an alkylene group having 1 to 20 carbon atoms, and in the alkylene group, 1 to 2 —CH₂- that are not adjacent to each other may be substituted by —O—, —C(=O)—, —NH—, —CH=CH—, —CONH—, a cyclo alkylene group having 3 to 8 carbon atoms, or an arylene group having 6 to 10 carbon atoms, and any hydrogen of the arylene group may be substituted by an alkyl group having 1 to 4 carbon atoms,

[Formula 3]

wherein R⁷, R⁸ and R⁹ are each an alkylene group having 1 to 20 carbon atoms, and in the alkylene group, 1 to 2 —CH₂- that are not adjacent to each other may be substituted by —O—, —C(=O)—, —NH—, —CH=CH—, —CONH—, a cyclo alkylene group having 3 to 8 carbon atoms, or an arylene group having 6 to 10 carbon atoms, and any hydrogen of the arylene group may be substituted by an alkyl group having 1 to 4 carbon atoms.

2. The polymerizable liquid crystal composition as set forth in claim 1, wherein the primary amino coupling agent is any one selected from the group consisting of methyl amine, ethyl amine, 1-propyl amine, 2-propyl amine, 1-butyl amine (N-butyl amine), 2-butyl amine, and 3-(dimethyl amino) propyl amine.

3. The polymerizable liquid crystal composition as set forth in claim 1, wherein the secondary amino coupling agent is represented by any one of the following Formula 4 to Formula 6:

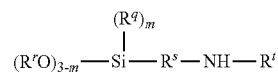

[Formula 4]

wherein $R^a$, $R^b$, $R^d$ and $R^e$ may be the same or different from each other and each are a hydrocarbon group having 1 to 8 carbon atoms, $R^c$ and $R^f$ may be the same or different from each other and each are an alkylene group having 1 to 20 carbon atoms, in the alkylene group, 1 to 2 —CH₂- that are not adjacent to each other may be substituted by —O—, —NH—, —CH=CH—, —CONH—, a cyclo alkylene group having 3 to 8 carbon atoms, or an arylene group having 6 to 10 carbon atoms, and any hydrogen of the arylene group may be substituted by an alkyl group having 1 to 4 carbon atoms, n and m are each an integer of 0 to 2;

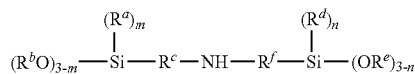

[Formula 5]

wherein $R^g$, $R^h$, $R^j$ and $R^k$ may be the same or different from each other and each are a hydrocarbon group having 1 to 8 carbon atoms, $R^i$, $R^o$ and $R^p$ may be the same or different from each other and each are an alkylene group having 1 to 20 carbon atoms, in the alkylene group, 1 to 2—CH₂- that are not adjacent to each other may be substituted by —O—, —NH—, —CH=CH—, —CONH—, a cyclo alkylene group having 3 to 8 carbon atoms, or an arylene group having 6 to 10 carbon atoms, and any hydrogen of the arylene group may be substituted by an alkyl group having 1 to 4 carbon atoms, n and m are each an integer of 0 to 2;

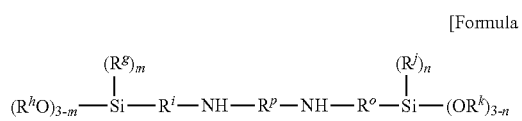

[Formula 6]

wherein $R^q$, $R^r$ and $R^t$ may be the same or different from each are other and each a hydrocarbon group having 1 to 8 carbon atoms, $R^s$ may be an alkylene group having 1 to 20 carbon atoms, in the alkylene group, 1 to 2 —CH— that are not adjacent to each other may be substituted by —O—, —NH—, —CH=CH—, —CONH—, a cyclo alkylene group having 3 to 8 carbon atoms, or an arylene group having 6 to 10 carbon atoms, and any hydrogen of the arylene group may be substituted by an alkyl group having 1 to 4 carbon atoms, and m is each an integer of 0 to 2.

4. The polymerizable liquid crystal composition as set forth in claim 1, wherein the primary or secondary amino coupling agent is any one selected from the group consisting of dimethyl amine, diethyl amine, dipropyl amine, dibutyl amine, azetidine, pyrrolidine, piperidine, cyclo propyl amine, cyclo butyl amine, cyclo propyl amine, cyclo hexyl amine, 2-azetidinone, 2-pyrrolidinone, and 2-piperidinone.

5. The polymerizable liquid crystal composition as set forth in claim 1, wherein the secondary amino coupling agent is any one selected from the group consisting of bis(3-trimethoxy silylpropyl) amine, bis(3-triethoxy silylpropyl) amine, bis(3-trimethoxy silylpropyl) ethylene diamine, bis(3-triethoxy silylpropyl) ethylene diamine, N-(n-butyl) -3~amino propyl trimethoxy silane, N-(n-butyl)-3-amino propyl triethoxy silane, N-methyl amino propyl trimethoxy silane, and N-methyl amino propyl triethoxy silane.

6. The polymerizable liquid crystal composition as set forth in claim 1, wherein the primary or secondary amino coupling agent is represented by the following Formula 7-1 to Formula 7-4:

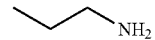

[Formula 7-1]

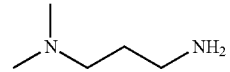

[Formula 7-2]

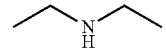

[Formula 7-3]

[Formula 7-4]

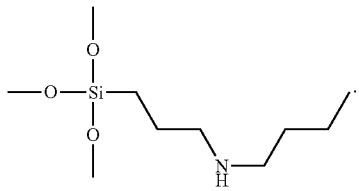

7. The polymerizable liquid crystal composition as set forth in claim 1, wherein the polymerizable reactive homeotropic alignment liquid crystal mixture further includes a reactive liquid crystal monomer, a surfactant, a photoinitiator and a solvent.

8. The polymerizable liquid crystal composition as set forth in claim 7, wherein the reactive liquid crystal monomer is one or more selected from the group consisting of compounds that are represented by the following Formula 8 to Formula 12:

[Formula 8]
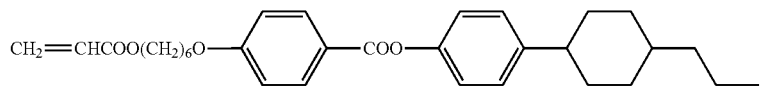

[Formula 9]
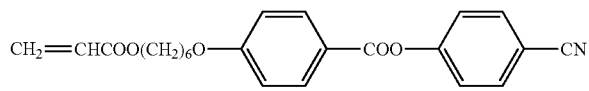

[Formula 10]
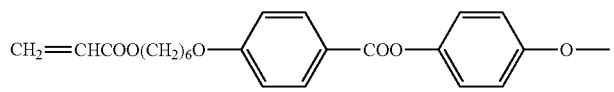

[Formula 11]
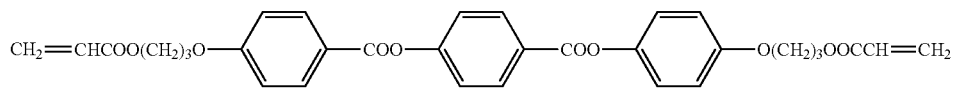

[Formula 12]
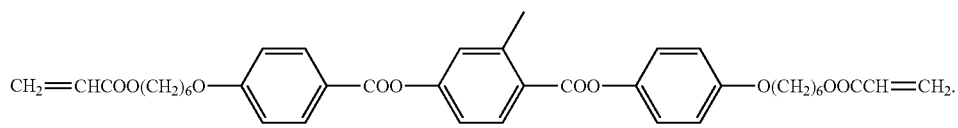

9. The polymerizable liquid crystal composition as set forth in claim 7, wherein the surfactant includes any one of fluorocarbon or silicon surfactants.

10. The polymerizable liquid crystal composition as set forth in claim 7, wherein the surfactant includes it in an amount in the range of 0.05 to 1% by weight on the basis of the polymerizable reactive homeotropic alignment liquid crystal mixture.

11. The polymerizable liquid crystal composition as set forth in claim 7, wherein the solvent is one or more selected from the group consisting of chloroform, dichloromethane, tetrachloroethane, trichloroethylene, tetrachloroethylene, chlorobenzene, benzene, toluene, xylene, methoxy benzene, 1,2-dimethoxybenzene, acetone, methyl ethyl ketone, cyclohexanone, cyclopentanone, methyl cellosolve, ethyl cellosolve, butyl cellosolve, diethylene glycol dimethyl ether (DEGDME), and dipropylene glycol dimethyl ether (DPGDME).

12. A method for manufacturing a homeotropic alignment liquid crystal film, the method comprising the steps of:
coating a polymerizable liquid crystal composition that includes a polymerizable reactive homeotropic alignment liquid crystal compound, and a primary or secondary amino coupling agent on a plastic substrate, the surface of which is subjected to the hydrophilic treatment, wherein the primary amino coupling agent is represented by the following Formula 1:

$$R^1-R^2-NH^2 \quad \text{[Formula 1]}$$

wherein $R^1$ is an alkyl group having 1 to 20 carbon atoms, and in the alkyl group, —CH3 at an end thereof may be substituted by —NH$_2$, R is a single bond, or an alkylene group having 1 to 20 carbon atoms, and in the alkylene group, 1 to 2 —CH$_2$- that are not adjacent to each other may be substituted by —O—, —C(=O)-, —NH—, —CH=CH—, —CONH—, a cyclo alkylene group having 3 to 8 carbon atoms, or an arylene group having 6 to 10 carbon atoms, and any hydrogen of the arylene group may be substituted by an alkyl group having 1 to 4 carbon atoms; and wherein the secondary amino coupling agent is represented by the following Formula 2 or Formula 3:

$$R^3-R^4-\overset{H}{N}-R^5-R^6 \quad \text{[Formula 2]}$$

wherein $R^3$ and $R^6$ are each an alkyl group having 1 to 20 carbon atoms, and in the alkyl group, —CH$_3$ at an end thereof may be substituted by —NH$_2$ or —Si(R')$_n$(OR")$_{3-n}$, R' and R" may be the same or different from each other and each are an alkylene group having 1 to 8 carbon atoms, and n is an integer of 0 to 2, $R^4$ and $R^5$ are each a single bond, or an alkylene group having 1 to 20 carbon atoms, and in the alkylene group, 1 to 2 —CH$_2$- that are not adjacent to each other may be substituted by —O—, —(X=O)—, —NH—, —CH=CH—, —CONH—, a cyclo alkylene group having 3 to 8 carbon atoms, or an arylene group having 6 to 10 carbon atoms, and any hydrogen of the arylene group may be substituted by an alkyl group having 1 to 4 carbon atoms,

[Formula 3]

wherein $R^7$, $R^8$ and $R^9$ are each a single bond, or an alkylene group having 1 to 20 carbon atoms, and in the alkylene group, 1 to 2 —CH$_2$- that are not adjacent to each other may be substituted by -0-, —C(O)—, —NH—, —CH=CH—, —CONH—, a cyclo alkylene group having 3 to 8 carbon atoms, or an arylene group having 6 to 10 carbon atoms, and any hydrogen of the arylene group may be substituted by an alkyl group having 1 to 4 carbon atoms.

13. The method for manufacturing a homeotropic alignment liquid crystal film as set forth in claim 12, wherein the primary amino coupling agent is any one selected from the group consisting of methyl amine, ethyl amine, 1-propyl amine, 2-propyl amine, 1-butyl amine, 2-butyl amine, and 3-(dimethyl amino)propyl amine.

14. The method for manufacturing a homeotropic alignment liquid crystal film as set forth in claim 12, wherein the secondary amino coupling agent is any one selected from the group consisting of dimethyl amine, diethyl amine, dipropyl amine, dibutyl amine, azetidine, pyrrolidine, piperidine, cyclo propyl amine, cyclo butyl amine, cyclo propyl amine, cyclo hexyl amine, 2-azetidinone, 2-pyrrolidinone, and 2-piperidinone.

15. The method for manufacturing a homeotropic alignment liquid crystal film as set forth in claim 12, wherein the secondary amino coupling agent is represented by any one of the following Formula 4 to Formula 6:

[Formula 4]

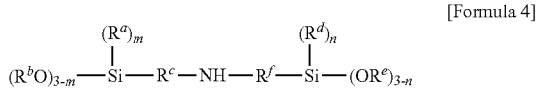

wherein $R^a$, $R^b$, $R^d$ and $R^e$ may be the same or different from each other and each are a hydrocarbon group having 1 to 8 carbon atoms, $R^c$ and $R^f$ may be the same or different from each other and each are an alkylene group having 1 to 20 carbon atoms, in the alkylene group, 1 to 2 —CH$_2$- that are not adjacent to each other may be substituted by —O—, —NH—, —CH=CH—, —CONH—, a cyclo alkylene group having 3 to 8 carbon atoms, or an arylene group having 6 to 10 carbon atoms, and any hydrogen of the arylene group may be substituted by an alkyl group having 1 to 4 carbon atoms, n and m are each an integer of 0 to 2;

[Formula 5]

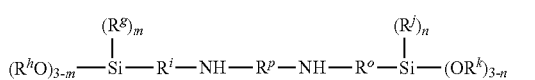

wherein $R^g$, $R^h$, $R^j$ and $R^k$ may be the same or different from each other and each are a hydrocarbon group having 1 to 8 carbon atoms, $R^i$, $R^o$ and $R^p$ may be the same or different from each other and each are an alkylene group having 1 to 20 carbon atoms, in the alkylene group, 1 to 2 —CH$_2$- that are not adjacent to each other may be substituted by —O—, —NH—, —CH=CH—, —CONH—, a cyclo alkylene group having 3 to 8 carbon atoms, or an arylene group having 6 to 10 carbon atoms, and any hydrogen of the arylene group may be substituted by an alkyl group having 1 to 4 carbon atoms, n and m are each an integer of 0 to 2;

[Formula 6]

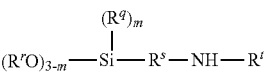

wherein $R^q$, $R^r$ and $R^t$ may be the same or different from each other and each are a hydrocarbon group having 1 to 8 carbon atoms, $R^s$ may be an alkylene group having 1 to 20 carbon atoms, in the alkylene group, 1 to 2 —CH$_2$- that are not adjacent to each other may be substituted by —O—, —NH—, —CH=CH—, —CONH—, a cyclo alkylene group having 3 to 8 carbon atoms, or an arylene group having 6 to 10 carbon atoms, and any hydrogen of the arylene group may be substituted by an alkyl group having 1 to 4 carbon atoms, and m is each an integer of 0 to 2.

16. The method for manufacturing a homeotropic alignment liquid crystal film as set forth in claim 12, wherein the secondary amino coupling agent is any one selected from the group consisting of bis(3-trimethoxy silylpropyl) amine, bis (3-triethoxy silylpropyl) amine, bis(3-trimethoxy silylpropyl) ethylene diamine, bis(3-triethoxy silylpropyl) ethylene diamine, N-(n-butyl)-3-amino propyl trimethoxy silane, N-(n-butyl)-3-amino propyl triethoxy silane, N-methyl amino propyl trimethoxy silane, and N-methyl amino propyl triethoxy silane.

17. The method for manufacturing a homeotropic alignment liquid crystal film as set forth in claim 12, wherein the primary or secondary amino coupling agent is represented by the following Formula 7-1 to Formula 7-4:

[Formula 7-1]

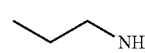

[Formula 7-2]

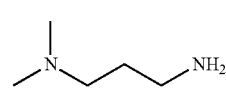

[Formula 7-3]

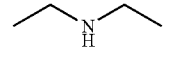

[Formula 7-4]

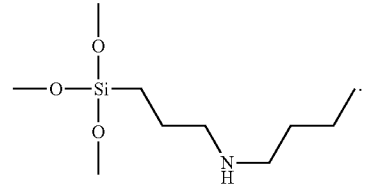

18. The method for manufacturing a homeotropic alignment liquid crystal film as set forth in claim 12, wherein the polymerizable reactive homeotropic alignment liquid crystal mixture further includes a reactive liquid crystal monomer, a surfactant, a photoinitiator and a solvent.

19. The method for manufacturing a homeotropic alignment liquid crystal film as set forth in claim 18, wherein the reactive liquid crystal monomer is one or more selected from the group consisting of compounds that are represented by the following Formula 8 to Formula 12:

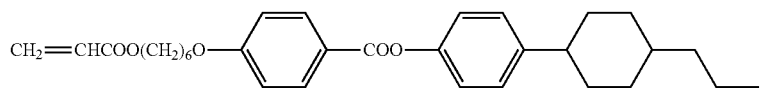

[Formula 8]

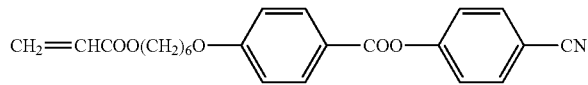

[Formula 9]

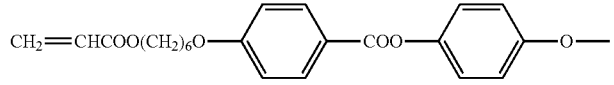

[Formula 10]

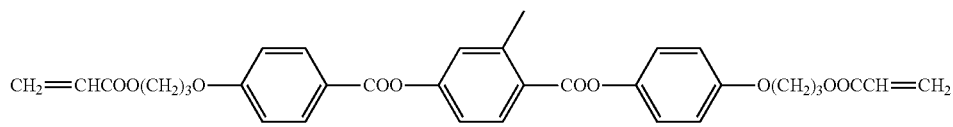

[Formula 11]

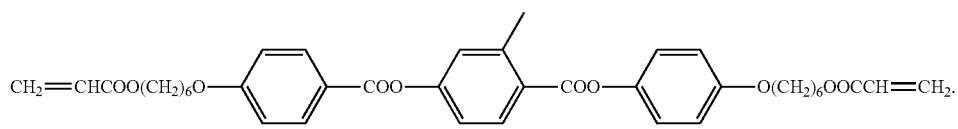

[Formula 12]

20. The method for manufacturing a homeotropic alignment liquid crystal film as set forth in claim 18, wherein the surfactant includes any one of fluorocarbon or silicon surfactants.

21. The method for manufacturing a homeotropic alignment liquid crystal film as set forth in claim 18, wherein the surfactant includes it in an amount in the range of 0.05 to 1% by weight on the basis of the polymerizable reactive homeotropic alignment liquid crystal mixture.

22. The method for manufacturing a homeotropic alignment liquid crystal film as set forth in claim 18, wherein the solvent is one or more selected from the group consisting of chloroform, dichloromethane, tetrachloroethane, trichloroethylene, tetrachloroethylene, chlorobenzene, benzene, toluene, xylene, methoxy benzene, 1,2-dimethoxybenzene, acetone, methyl ethyl ketone, cyclohexanone, cyclopentanone, methyl cellosolve, ethyl cellosolve, butyl cellosolve, diethylene glycol dimethyl ether (DEGDME), and dipropylene glycol dimethyl ether (DPGDME).

23. The method for manufacturing a homeotropic alignment liquid crystal film as set forth in claim 12, wherein the hydrophilic treatment is a corona discharge treatment or plasma treatment.

24. A homeotropic alignment liquid crystal film that is manufactured by using the method according claim 12.

25. A liquid crystal display device comprising the homeotropic alignment liquid crystal film according to claim 24.

\* \* \* \* \*